United States Patent
Cisek et al.

(10) Patent No.: US 8,062,094 B2
(45) Date of Patent: Nov. 22, 2011

(54) PROCESS OF DURABILITY IMPROVEMENT OF GEAR TOOTH FLANK SURFACE

(75) Inventors: Roman Cisek, Cedar Falls, IA (US); Jeffrey Brengle Finn, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 943 days.

(21) Appl. No.: 11/170,198

(22) Filed: Jun. 29, 2005

(65) Prior Publication Data

US 2007/0000130 A1    Jan. 4, 2007

(51) Int. Cl.
*B24B 1/00* (2006.01)

(52) U.S. Cl. ............ 451/33; 451/34; 451/35; 451/37; 451/47; 451/54; 451/55; 451/57

(58) Field of Classification Search ........... 451/514, 451/147, 161, 156, 72, 219, 232, 253, 275, 451/33, 34, 35, 37, 47, 53, 54, 55, 57, 104, 451/113; 148/586, 654; 266/125, 87; 48/586, 48/654, 511, 673
See application file for complete search history.

(56) References Cited

U.S. PATENT DOCUMENTS

| | | | | |
|---|---|---|---|---|
| 2,711,673 | A * | 6/1955 | Miller | 409/12 |
| 3,950,642 | A | 4/1976 | Feld | |
| 4,034,585 | A * | 7/1977 | Straub | 72/53 |
| 4,102,176 | A | 7/1978 | Fuchs | |
| 4,167,864 | A * | 9/1979 | Taipale | 72/53 |
| 4,222,793 | A * | 9/1980 | Grindahl | 148/544 |
| 4,354,371 | A | 10/1982 | Johnson | |
| 4,491,500 | A | 1/1985 | Michaud et al. | |
| 4,693,102 | A | 9/1987 | Amy et al. | |
| 4,705,594 | A | 11/1987 | Zobbi et al. | |
| 4,818,333 | A | 4/1989 | Michaud | |
| 4,949,456 | A * | 8/1990 | Kovach et al. | 29/893.35 |
| 5,129,190 | A * | 7/1992 | Kovach et al. | 451/53 |
| 5,158,629 | A | 10/1992 | Zobbi | |
| 5,178,028 | A * | 1/1993 | Bossler, Jr. | 74/416 |
| 5,193,375 | A | 3/1993 | Meister | |
| RE34,272 | E | 6/1993 | Michaud et al. | |
| 5,279,174 | A * | 1/1994 | Minegishi | 74/458 |
| 5,477,976 | A * | 12/1995 | Suzuki et al. | 216/109 |
| 5,503,481 | A | 4/1996 | Hashimoto et al. | |
| 5,595,613 | A * | 1/1997 | Hatano et al. | 148/319 |
| 5,911,780 | A * | 6/1999 | Hamasaka et al. | 72/53 |
| 5,916,383 | A * | 6/1999 | Rokutanda et al. | 148/516 |
| 6,146,253 | A * | 11/2000 | Litvin et al. | 451/47 |

(Continued)

OTHER PUBLICATIONS

Chemically Accelerated Vibratory Finishing for the Elimination of Wear and Pitting of Alloy Steel Gears, 13 pages, by: M. Michaud, G. Sroka and L. Winkelmann, REM Chemicals, Inc., American Gear Manufacturers Association, Technical Paper.

(Continued)

*Primary Examiner* — Timothy V Eley

(57) ABSTRACT

Pinion gears for planetary gear transmissions are hobbed, heat treated, and then ground to get better control of the leads/profiles on all the gear teeth. Then a light shot peening is applied to the tooth flanks to achieve the desired compressive residual stresses on the tooth surface. By applying the process in the controlled manner specified, the surface is not over-cold worked. Next, a chemically assisted isotropic surface treatment is applied over the pinion gears to improve the surface finish on the gear teeth. For low speed applications the surface finish improves the lambda ratio, allowing for a good oil film thickness on the surface of the gear teeth.

12 Claims, 1 Drawing Sheet

U.S. PATENT DOCUMENTS

| | | | | |
|---|---|---|---|---|
| 6,170,156 | B1* | 1/2001 | Lev et al. | 29/893.1 |
| 6,315,455 | B1* | 11/2001 | Tanaka et al. | 384/492 |
| 6,390,894 | B1* | 5/2002 | Beel et al. | 451/47 |
| 6,519,847 | B1* | 2/2003 | Trudeau et al. | 29/888.44 |
| 6,612,909 | B2 | 9/2003 | Wern | |
| 6,629,906 | B1* | 10/2003 | Chiba et al. | 476/72 |
| 2001/0033706 | A1* | 10/2001 | Shimomura et al. | 384/569 |
| 2003/0070297 | A1* | 4/2003 | Nakaoka | 29/893.34 |
| 2003/0131473 | A1* | 7/2003 | Trudeau et al. | 29/888.44 |
| 2003/0200846 | A1* | 10/2003 | Chiba et al. | 82/104 |
| 2005/0112279 | A1* | 5/2005 | Kern | 427/240 |
| 2005/0123432 | A1* | 6/2005 | Sun et al. | 419/29 |

OTHER PUBLICATIONS

Effect of Superfinishing on Scuffing Resistance, 6 pages, by: Lane W. Winkelmann, Mark D. Michaud, Ray W. Snidle and Mark P. Alanou, Proceedings of DETC'03 ASME 2003 Design Engineering Technical Conferences and Computers and Information in Engineering Conference Chicago, Illinois, USA, Sep. 2-6, 2003.

Surface Fatigue Lives of Case-Carburized Gears With an Improved Surface Finish, 11 pages, by: T.L. Krantz, M.P. Alanou, H.P. Evans and R.W. Snidle, Proceedings of ASME 2000 Design Engineering Technical Conferences and Computers and Information in Engineering Conference Sep. 10-13, 2000, Baltimore, Maryland.

Effect of Shot Peening on the Pitting Fatigue Strength of Carburized Gears, 11 pages, by: Motokazu Kobayashi and Katsutoshi Hasegawa, Mitsubishi Motors Corporation, Japan.

Improvement in Surface Fatigue Life of Hardened Gears by High-Intensity Shot Peening, 8 pages, by: Dennis P. Townsend, Lewis Research Center, Cleveland, Ohio, US Army Aviation System Command. NASA Techinical Memorandum 105678.

Basic Studies on Fatigue Strength of Case-Hardened Gear Steel-Effects of Shot Peening and/or Barrelling Processes, 9 pages, by: S. Hoyashita, Saga University, M. Hashimoto, Sumitomo Heavy Industries and K. Seto, Saga University, American Gear Manufacturers Association, Technical Paper.

Effects of Shot Peening and Grinding on Gear Strength, 10 pages, by: Toru Sakurada and Motokazu Kobayashi, Mitsubishi Motors Corporation, SAE Techinical Paper Series, 940729.

* cited by examiner

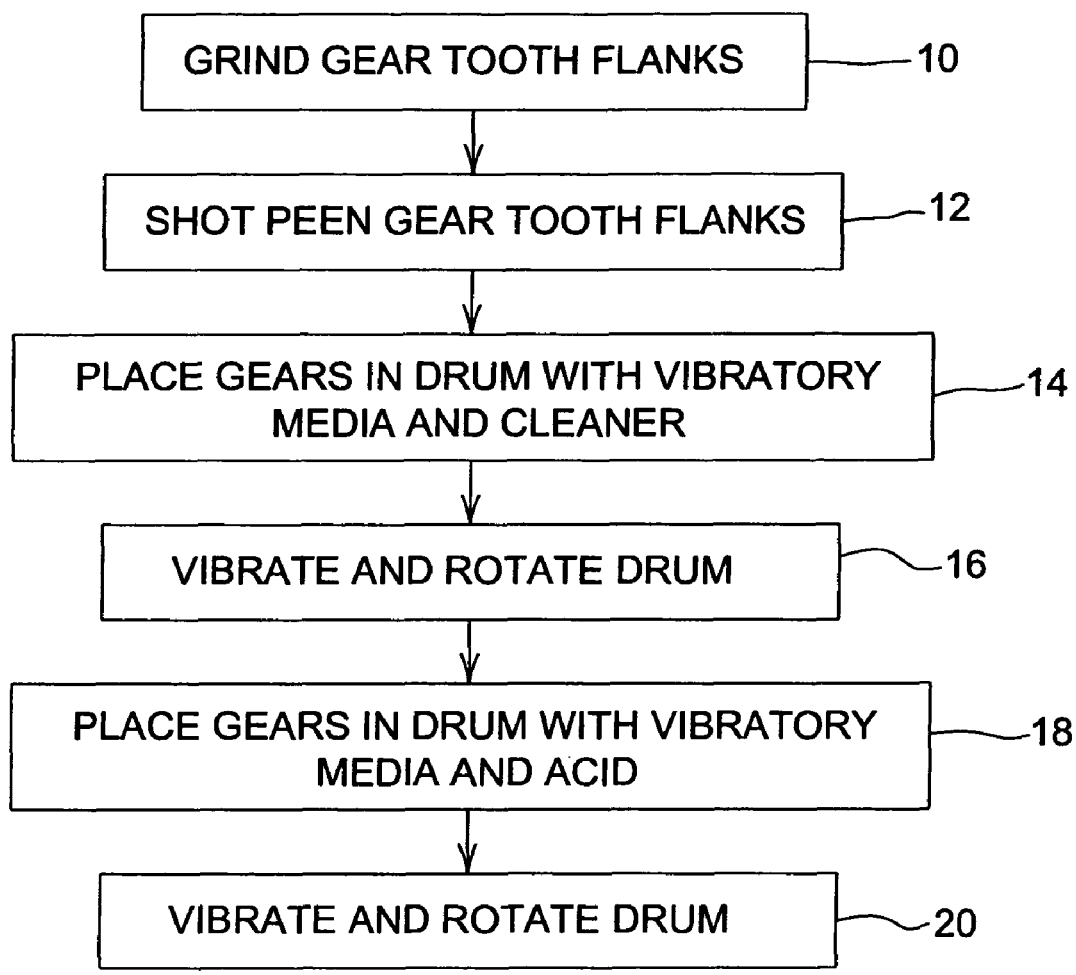

PROCESS OF DURABILITY IMPROVEMENT OF GEAR TOOTH FLANK SURFACE

FIELD OF THE INVENTION

The present invention relates generally to vehicle transmissions. More particularly, the present invention relates to toothed gears such as those found in planetary gear transmissions. Specifically, the present invention relates to methods for treating such gears during the gear manufacturing process to improve gear durability.

BACKGROUND OF THE INVENTION

Vehicle power levels are increasing at a steady rate. Increased power dramatically reduces the life of drive train components, with the weakest area typically being the axle final drive planetary gear reduction. For example in some agricultural tractors the final drive planetary gear reduction is 6:875:1. The highest stress component is the sun gear. Typically, sun gears fail from pitting caused by very high compressive stresses on the tooth surface. Often packaging constraints in both diameter and width prevent gear designers from developing a new larger design to transmit the increased power. Standard gears are manufactured by a hobbing, shaving, and heat-treating operations. There can be considerable geometry distortion of the gear leads and profiles after heat-treatment. In addition, the surface doesn't have enough compressive residual stress to sustain a long life under severe loading. Accordingly there is a need in the art for a new gear manufacturing method that yields greater than a five time increase in sun gear durability, without changing the overall size of the existing planetary.

SUMMARY OF THE INVENTION

In view of the foregoing, it is an object of the invention to provide an improved method for producing gears.

Another object of the invention is the provision of such a method that provides an increase in gear durability.

A further object of the invention is to provide such a method that does not distort or otherwise change the gear leads or profiles.

An additional object of the invention is the provision of such a method that reduces the amount of pitting failures of gears caused by high compressive stresses on the tooth surface.

According to the invention the sun gear is hobbed, heat treated, and then ground to get better control of the leads/profiles on all the gear teeth. Then a light shot peening is applied to the tooth flanks to achieve the desired compressive residual stresses on the tooth surface. By applying the process in the controlled manner specified, the surface is not over-cold worked. Next, a chemically assisted isotropic surface treatment is applied over the sun gear to improve the surface finish on the gear teeth. For low speed applications (0.5 m/s surface velocities common in tractor final drives) the surface finish is absolutely critical for improving the lambda ratio, allowing for a good oil film thickness on the surface of the gear teeth. Often, slow speed gears can't maintain a proper oil film, causing metal on metal contact, leading to premature pitting failures.

Also according to the invention, the planetary gears that mesh with the sun gear are ground, and have the isotropic finish process applied to the gear surface for the reasons described above.

The foregoing and other objects of the invention together with the advantages thereof over the known art which will become apparent from the detailed specification which follows are attained by a method for improving the durability of a pinion gear comprising the steps of: grinding tooth flanks on the pinion gear; shot peening the tooth flanks of the pinion gear; and, polishing surfaces of the tooth flanks using a chemically assisted surface finishing process.

To acquaint persons skilled in the art most closely related to the present invention, one preferred embodiment of the invention that illustrates the best mode now contemplated for putting the invention into practice is described herein by and with reference to, the annexed drawings that form a part of the specification. The exemplary embodiment is described in detail without attempting to show all of the various forms and modifications in which the invention might be embodied. As such, the embodiment shown and described herein is illustrative, and as will become apparent to those skilled in the art, can be modified in numerous ways within the spirit and scope of the invention—the invention being measured by the appended claims and not by the details of the specification.

BRIEF DESCRIPTION OF THE DRAWINGS

For a complete understanding of the objects, techniques, and structure of the invention reference should be made to the following detailed description and accompanying drawings, wherein:

FIG. 1 is a flow chart illustrating the steps of the method of the invention.

DESCRIPTION OF THE PREFERRED EMBODIMENT

With reference now to FIG. 1 it can be seen that the steps of the method of the present invention are illustrated by way of a flow chart. At 10 pinion gears such as sun or planet gears for a planetary transmission preferably made from a carburized and hardened steel having a surface hardness of 58-64 RC are hobbed, heat treated, and then ground to get better control of the leads/profiles on all the gear teeth.

At 12 the tooth flanks of the pinion gears are shot peened. Preferably the shot peening process uses a steel shot having a hardness of 55-62 RC and a diameter of 0.010-0.025 inches. The intensity of shot peening is expressed in the arc height of the Almen A-Strip being in the range of 0.008-0.014 inches. The pinion gear tooth flanks are shot peened to attain a coverage between 100% and 200%.

At 14 the pinion gears may be placed in a holding fixture with like parts and placed in a vessel such as a rotatable drum with a vibratory media and a cleaning chemical such as commercially available Castrol Kleen 3660™. At 16 the drum is then rotated and vibrated for a period of time to thoroughly clean the gears before further treatment. It has been found that planetary final drive gears should preferably be cleaned for approximately 240 minutes before further treatment.

At 18 the cleaner is replaced with an acid for further treatment, or the gears are transferred to another vessel containing an acid and vibratory media. At 20 the vessel or drum is again rotated and vibrated to further polish the gears. The acid used at steps 16-20 is preferably one of a number of proprietary compounds commercially available from e.g. REM Chemicals Inc. of Southington, Conn. This is an isotropic finishing process wherein the chemical (acid) makes surface asperities on the gear hard and brittle. The vibratory media then polishes off the now brittle asperities as the holding vessel is rotated and vibrated, leaving a very smooth surface.

Those having skill in the art will recognize that surface finish is critical on low speed gears for developing better lambda ratio (a ratio of oil film thickness to the surface roughness on the gear tooth surface). The smoother the tooth surface is, the bigger the lambda ratio and subsequently the gear surface durability. One of the advantages of the invention is that it creates a tooth surface that can achieve higher lambda ratio in the slow speed final drive sun gears. For pinion gears of planetary final drives the isotropic process is continued until the gear tooth flanks attain a maximum roughness (Ra) of 10 micro-inches (measured in the profile direction). It has been found that gears such as those described above will attain the desired smoothness after approximately 40 minutes, however those having skill in the art will recognize that the time required will vary depending on the chemical and vibratory media used as well as the amount of vibration and may further vary depending on the characteristics of the particular part being treated.

Based on laboratory test results in several final drive applications, the above-described invention provides a minimum of five times increased life. Resulting in a significant increase in planetary gear reliability—a common problem on many drive train products. Thus the need to increase the size of planetary gears for increased power is obviated, resulting in less costly gears. The invention provides the increased life by changing the sun and planet gear finishing processes, leaving the overall package size and other components identical. The total life improvement has potential to be even more than five times.

Thus it can be seen that the objects of the invention have been satisfied by the structure presented above. While in accordance with the patent statutes, only the best mode and preferred embodiment of the invention has been presented and described in detail, it is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

The embodiments of the invention in which an exclusive property or privilege is claimed are defined as follows:

1. A method for improving the durability of a pinion gear comprising the steps of:
   hobbing and heat treating the pinion gear;
   grinding tooth flanks on the pinion gear after hobbing and heat treating the pinion gear;
   shot peening the tooth flanks, after grinding the tooth flanks, of the pinion gear; and,
   polishing surfaces of the tooth flanks, after shot peening, using a chemically assisted surface finishing process to obtain a maximum tooth flank surface roughness (Ra) of 10 micro-inches, as measured in the profile direction), the chemically assisted surface finishing process being an isotropic process wherein a chemical bath is applied to the gear to make surface asperities on the gear hard and brittle and a vibratory media is then used to polish off the brittle asperities.

2. A method for improving the durability of a pinion gear as set forth in claim 1, wherein the pinion gear is made of a carburized and hardened steel.

3. A method for improving the durability of a pinion gear as set forth in claim 1, wherein the pinion gear has a surface hardness of 58-64 RC before hobbinq and heat treating the pinion gear.

4. A method for improving the durability of a pinion gear as set forth in claim 3, wherein, in the shot peening step, the tooth flanks of the pinion gear are shot peened with a medium having a hardness of 55-62 RC.

5. A method for improving the durability of a pinion gear as set forth in claim 4, wherein, in the shot peening step, the tooth flanks of the pinion gear are shot peened with a medium having a diameter of 0.010-0.025 inches.

6. A method for improving the durability of a pinion gear as set forth in claim 5, wherein the shot peening intensity of the shot peening step of the pinion gear is expressed in the arc height of the "Almen" A-strip being in the range of 0.008-0.014 inches.

7. A method for improving the durability of a pinion gear as set forth in claim 6, wherein a shot peening coverage of the shot peening process of the pinion gear is in the range of 100-200%.

8. A method for improving the durability of a pinion gear as set forth in claim 4, wherein the shot peening medium is steel shot.

9. A method for improving the durability of a pinion gear as set forth in claim 1, wherein the pinion gear is a sun pinion that is part of a planetary final drive of a vehicle and a driving member of the final drive.

10. A method for improving the durability of a pinion gear as set forth in claim 1, wherein the pinion gear is a planet gear that meshes with a sun pinion in a planetary final drive of a vehicle.

11. A method for improving the durability of a pinion gear as set forth in claim 1, wherein the chemical bath and vibratory media are placed in a drum along with the pinion gear and the drum is vibrated and rotated.

12. A method for improving the durability of a pinion gear as set forth in claim 1, wherein the chemically assisted surface finishing process comprises first placing the pinion gear in a chemical bath with a cleaner, and then placing the pinion gear in a chemical bath with an acid.

* * * * *